United States Patent
Banzhaf et al.

(10) Patent No.: US 6,792,898 B2
(45) Date of Patent: Sep. 21, 2004

(54) FOLEY AND LARDNER

(75) Inventors: Matthias Banzhaf, Heilbronn (DE);
Markus Glaser, Sindelfingen (DE);
Michael Schmidt, Karlsruhe (DE);
Andreas Seeger, Aichwald (DE);
Marcus Weinbrenner, Stuttgart (DE)

(73) Assignee: Behr GmbH & Co., Stuttgart (DE)

( * ) Notice: Subject to any disclaimer, the term of this patent is extended or adjusted under 35 U.S.C. 154(b) by 34 days.

(21) Appl. No.: 10/246,756

(22) Filed: Sep. 19, 2002

(65) Prior Publication Data
US 2003/0070427 A1 Apr. 17, 2003

(30) Foreign Application Priority Data
Sep. 20, 2001 (DE) .......................................... 101 46 346

(51) Int. Cl.[7] .............................................. F01P 11/02
(52) U.S. Cl. ................... 123/41.1; 237/12.3 A
(58) Field of Search ........................ 123/41.1, 142.5 R, 123/41.31; 237/12.3 R, 12.3 A

(56) References Cited

U.S. PATENT DOCUMENTS

| | | |
|---|---|---|
| 1,168,623 A | 1/1916 | Furber |
| 2,038,193 A | 4/1936 | Parsons |
| 4,911,110 A | 3/1990 | Isoda et al. |
| 2001/0013409 A1 | 8/2001 | Burk et al. |

FOREIGN PATENT DOCUMENTS

| | | | | |
|---|---|---|---|---|
| DE | 384738 | * | 11/1923 | |
| DE | 733046 | * | 3/1943 | |
| DE | 860757 | * | 12/1952 | |
| DE | 950 047 | | 10/1956 | |
| DE | 195 37 798 A1 | | 4/1996 | |
| DE | 19746658 A1 | * | 4/1999 | |
| DE | 10017434 A1 | * | 10/2001 | |
| DE | 100 47 810 A1 | | 4/2002 | |
| EP | 0 985 807 A1 | | 3/2000 | |
| FR | 1478913 | * | 3/1967 | |
| FR | 2489415 | * | 3/1982 | |
| GB | 1580965 | * | 12/1980 | |
| JP | 09203567 A | * | 8/1997 | ........... F25B/27/00 |
| JP | 11281194 A | * | 10/1999 | ........... F25B/27/00 |

OTHER PUBLICATIONS

Flick et al., Beheizung von Fahrzeugen mit verbrauchsoptimierten Motoren, 01–1997, Behr Automobiltechnik, pp. 1–19.*

M. Flik, et al., "Heating Systems for Vehicles with High Efficiency Engines", Behr Automobiltechnik, Stuttgart, 1997, pp. 1–19.

* cited by examiner

Primary Examiner—Noah P. Kamen
(74) Attorney, Agent, or Firm—Foley & Lardner LLP

(57) ABSTRACT

The invention relates to a coolant circuit for a motor vehicle having an engine and a radiator. The coolant circuit includes an exhaust gas heat exchanger and enables engine coolant coming from the radiator to be supplied directly to the exhaust gas heat exchanger. In a preferred embodiment, coolant coming from the radiator and/or from the engine can be selectively supplied to the exhaust gas heat exchanger via a changeover device.

20 Claims, 2 Drawing Sheets

FOLEY AND LARDNER

CROSS-REFERENCE TO RELATED PATENT APPLICATIONS

Federal Republic of Germany Priority Application 101 46 346.4, filed Sep. 20, 2001 including the specification, drawings, claims and abstract, is incorporated herein by reference in its entirety.

BACKGROUND OF THE INVENTION

The invention relates to a coolant circuit for a motor vehicle having an engine that is cooled with an engine coolant.

DE 198 47 607 A1 discloses a heating circuit for a motor vehicle, in which a supply heater for the heating circuit is provided. The exhaust gases of the engine are fed into an exhaust system upstream or downstream of a catalytic converter.

DE 31 03 198 A1 discloses a heat exchanger which is arranged in an exhaust system and which makes additional heating capacity available.

WO 97/47865 relates to a heat exchanger for the exhaust gas recirculation line that can be integrated into the coolant circuit, so that, even with the heating device switched off, the heat absorbed from the recirculated exhaust gas heats up the coolant, in order to achieve a cooling of the recirculated exhaust gas even when the heating is not in use. In this case, the heat exchanger may also be incorporated directly into the heating circuit if the coolant flows constantly through the heat exchanger. As a result of the cooling of the exhaust gas by the heat exchanger, a lowering of the combustion peak temperature and a reduction in the NOx emissions occur.

However, coolant circuits of this type still leave much to be desired.

SUMMARY OF THE INVENTION

One object of the present invention is to provide an improved coolant circuit of the type discussed above.

Another object of the invention is to provide an improved method of cooling the exhaust gases from an engine in a motor vehicle.

A further object resides in providing an improved motor vehicle containing the improved cooling circuit according to the invention.

In accordance with one aspect of the present invention, there has been provided a coolant circuit for a motor vehicle having an engine that is cooled with an engine coolant, comprising: a radiator for cooling the engine coolant; an exhaust gas heat exchanger; and a passageway for supplying engine coolant from the radiator directly to the exhaust gas heat exchanger.

In accordance with another aspect of the invention, there is provided a method of controlling the temperature of exhaust gas supplied to a catalytic converter from an engine in a motor vehicle that includes an engine coolant circuit and a radiator in the engine coolant circuit, comprising exchanging heat between the exhaust gas and the engine coolant in a heat exchanger; and supplying engine coolant directly to the heat exchanger from the radiator.

In accordance with yet another aspect of the invention, there is provided a motor vehicle having an engine that is cooled with an engine coolant by means of a coolant circuit, wherein the coolant circuit comprises a coolant circuit as described above.

In an alternative aspect of the present invention, there is provided a coolant circuit for a motor vehicle having an engine that is cooled with an engine coolant, comprising: a radiator for cooling the engine coolant; an exhaust gas heat exchanger; a passageway for supplying engine coolant to the exhaust gas heat exchanger; and a control system for controlling the temperature of engine coolant supplied to the exhaust gas heat exchanger, comprising an arrangement for selectively feeding engine coolant directly from the radiator into the passageway.

According to still another aspect of the invention, there has been provided a method of utilizing exhaust gas heat from an engine in a motor vehicle to heat an internal compartment of the vehicle that includes an engine coolant circuit and a radiator in the engine coolant circuit, comprising: exchanging heat between the exhaust gas and the engine coolant in a first heat exchanger; supplying engine coolant directly to the heat exchanger from the radiator; and exchanging heat between the engine coolant downstream of the exhaust gas heat exchanger and air being fed into the internal vehicle compartment in a second heat exchanger.

Further objects, features and advantages of the present invention will become apparent from the detailed description of preferred embodiments that follows, when considered together with the accompanying drawings.

DETAILED DESCRIPTION OF THE PREFERRED EMBODIMENTS

In the present invention, coolant coming from the radiator can be supplied directly to the exhaust gas heat exchanger, i.e., without elements being interposed that appreciably influence the temperature of the coolant, such as, for example, heat exchangers.

Preferably, coolant coming selectively from the radiator, i.e., cooled coolant, or from the engine outlet, i.e., uncooled coolant, can be supplied to the exhaust gas heat exchanger either separately or at the same time. Preferably, in this case, the coolant supply from the radiator or engine outlet to the exhaust gas heat exchanger is regulated by means of a changeover device, preferably comprising one or more valves.

In one preferred embodiment, coolant coming directly from the engine can be supplied to the exhaust gas heat exchanger, i.e., without elements being interposed that appreciably influence the temperature of the coolant. According to another preferred embodiment, the coolant coming from the radiator and from the engine can be supplied to the exhaust gas heat exchanger, with regulation being carried out, for example, via one 3-way valve, two 2-way valves or a thermostat.

Optionally, in addition to a coolant pump arranged preferably directly upstream of the engine, an additional pump is provided for assistance in the coolant circuit. The additional pump is preferably arranged in the heating circuit, i.e., that part of the coolant circuit which includes a heater for a vehicle compartment, preferably the vehicle passenger compartment.

A coolant circuit of this type can be used, on the one hand, for controlling the temperature of the exhaust gas supplied to a catalytic converter, so that the catalytic converter can be operated at optimum temperatures and the quantity of pollutants emitted can be minimized. On the other hand, the coolant circuit can also be used as a supply heater, in order to accelerate the heating of the coolant and/or passenger compartment space.

Figure 1:
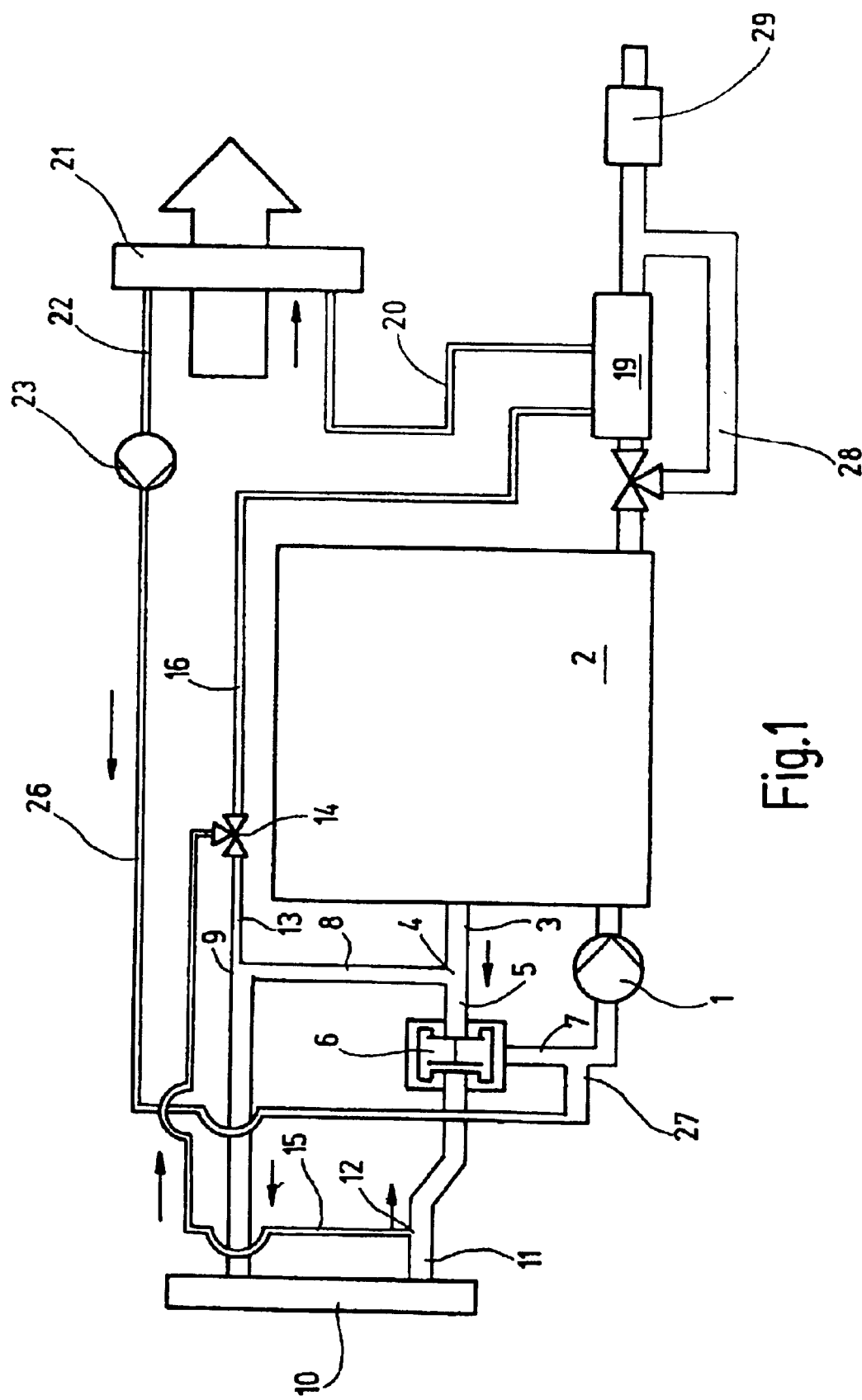
FIG. 1 is a diagram schematically illustrating a coolant circuit according to the invention with a 3-way valve.

The invention is explained in more detail below with reference to exemplary embodiments illustrated in the drawings. FIG. 1 shows a diagrammatically illustrated coolant circuit according to an exemplary embodiment.

FIG. 1 shows, schematically and in greatly simplified form, the coolant circuit of a motor vehicle, in particular of a motor vehicle with a direct-injection gasoline engine. In this case, coolant is pumped into the engine 2 of the motor vehicle by means of a coolant pump 1. After heat has been extracted from the engine, the coolant passes via a line 3 to a branch 4. The branch 4 leads with one arm, designated as the line 5, to a thermostat 6 and from the latter, via a line 7, back to the coolant pump 1 again.

The other arm of the branch 4, designated below as the line 8, leads via a first small junction 9 to the radiator 10. A line 11 leads from the radiator 10 past a second small junction 12, once again, to the thermostat 6, from where the coolant is delivered to the coolant pump 1 again. In this case, the thermostat 6 ensures that, when the engine 2 is started, that is to say when the coolant is still cold, the coolant is supplied directly to the engine 2 again, i.e., is not fed to the radiator 10. When the coolant has reached a defined temperature, it is led to the radiator 10, where it can discharge excess heat into the surroundings.

Starting from the first small junction 9, a line 13 leads to a first valve 14. The line 15 departing at the second small junction 12 also leads directly to this first valve 14. Thus, coolant can pass from upstream or downstream of the radiator 10 to the valve 14 and to the lines that are downstream of the valve 14.

Starting from the valve 14, a line 16 leads to an exhaust gas heat exchanger 19, and, starting from the latter, a line 20 leads to a heater 21, at which heat can be discharged into the air, e.g., into the passenger compartment of a vehicle, as indicated by an arrow in FIG. 1. Starting from the heater 21, a line 22 leads to an additional water pump 23 and then to a line 26 which leads to a junction 27 into the line 7, so that the coolant is supplied to the coolant pump 1 again.

In the exhaust gas heat exchanger 19, heat is extracted from the exhaust gas generated by the engine 2. If, however, the temperature of the coolant is too high, then, with the valve 14 in a corresponding position, coolant coming directly from the radiator 10 can be supplied to the exhaust gas heat exchanger 19. This prevents the coolant in the exhaust gas heat exchanger 19 from boiling and ensures that the function as an exhaust gas radiator is preserved and also that the heat exchanger 19 is not damaged. Furthermore, by an appropriate regulation of the valve 14, it is possible to ensure that the coolant temperature upstream of the exhaust gas heat exchanger 19 does not fall below a defined temperature, for example, 90° C., and that the coolant temperatures downstream of the exhaust gas heat exchanger 19 correspond approximately to the coolant temperature of characteristic map cooling.

The exhaust gas heat exchanger 19 has a bypass 28, through which, if required, part of the exhaust gas originating from the engine 2 can be led past the exhaust gas heat exchanger 19.

The coolant circuit functions as follows: when the coolant cooling the engine 2 has a temperature that is above a predetermined limit value (there are two temperatures in characteristic map cooling), the thermostat 6 regulates the flow of the coolant in such a way that the coolant is no longer supplied directly to the engine 2 via the coolant pump 1, but is led via the radiator 10, at which it can discharge excess heat.

The coolant serves, furthermore, for cooling the exhaust gas which is supplied, downstream of the exhaust gas heat exchanger 19, to an NOx storage catalytic converter 29 and which is purified by the latter. This NOx storage catalytic converter 29 has the best operating preconditions within a fixed temperature window, for which purpose the exhaust gas is cooled to a corresponding temperature. To this effect, coolant is supplied, as required, from upstream of the radiator 10 and/or downstream of the radiator 10 to the exhaust gas heat exchanger 19. Constant exhaust gas temperatures can be achieved by means of an appropriate regulation of the bypass 28.

Furthermore, during cold starting, the exhaust gas heat exchanger 19 may also be used as a supply heater, in order to achieve more rapid passenger compartment and coolant heating.

Figure 2:
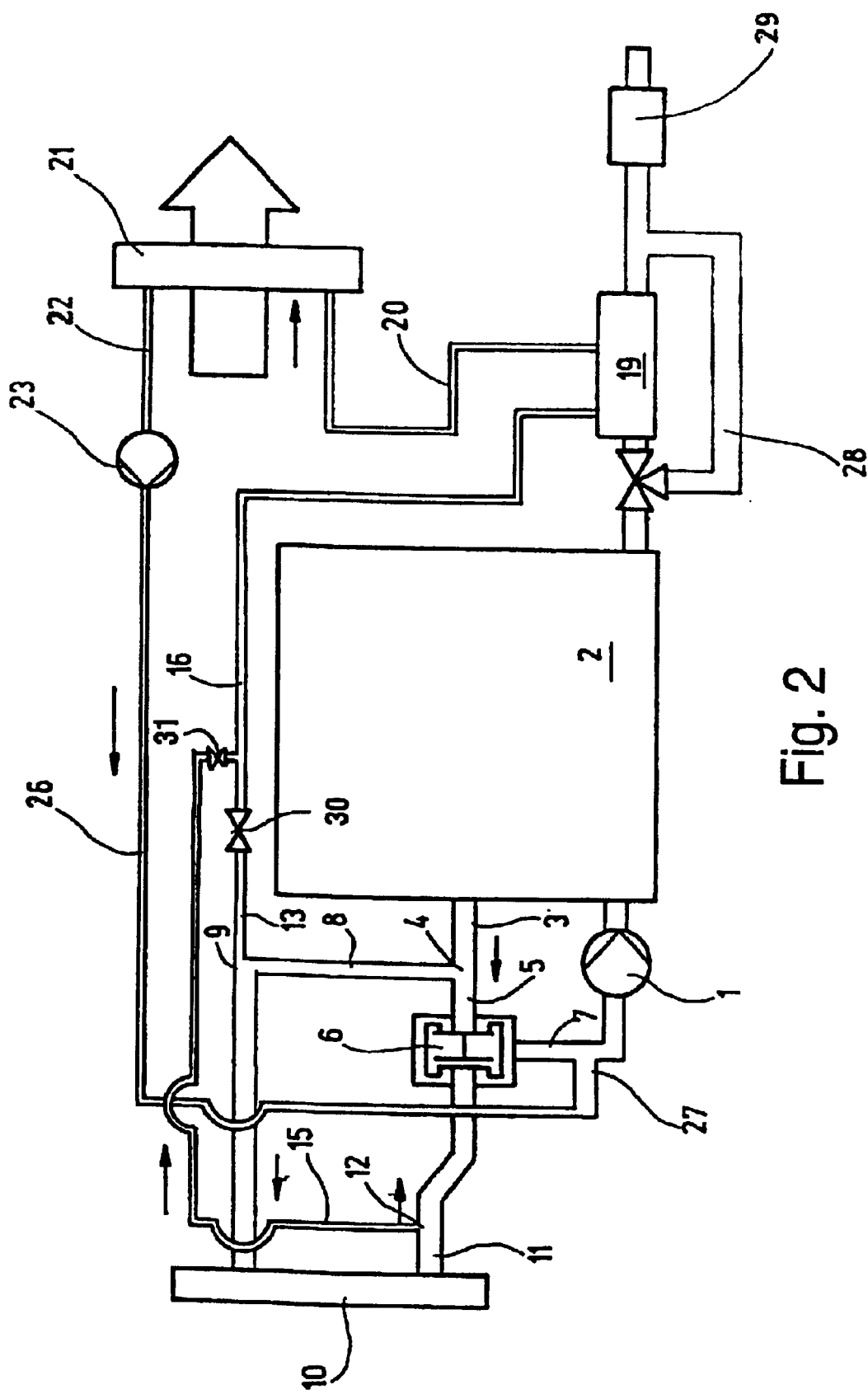
FIG. 2 is a diagram schematically illustrating a coolant circuit according to an embodiment of the invention with two 2-way valves.

FIG. 2 shows, schematically and in greatly simplified form, an embodiment of the invention with two 2-way valves 30, 31 instead of the 3-way valve 14 depicted in FIG. 1.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A coolant circuit for a motor vehicle having an engine that is cooled with an engine coolant, comprising:
   a radiator for cooling the engine coolant;
   an exhaust gas heat exchanger;
   a passageway for supplying engine coolant from the radiator directly to the exhaust gas heat exchanger;
   a changeover device for selectively supplying engine coolant from the radiator and/or from the engine to the exhaust gas heat exchanger; and
   a heater for heating air for the interior of a motor vehicle by heat exchange with engine coolant exiting the exhaust gas heat exchanger.

2. A coolant circuit as claimed in claim 1, wherein the changeover device comprises a valve exchanger.

3. A coolant circuit as claimed in claim 2, wherein the valve comprises a 3-way valve.

4. A coolant circuit as claimed in claim 2, wherein the valve comprises two 2-way valves.

5. A coolant circuit as claimed in claim 1, wherein the changeover device includes a thermostat.

6. A coolant circuit as claimed in claim 1, further comprising a first engine coolant pump and a second engine coolant pump.

7. A coolant circuit as claimed in claim 6, wherein the first engine coolant pump is arranged upstream of the engine.

8. A coolant circuit as claimed in claim 6, wherein the coolant circuit further comprises a vehicle compartment heating circuit containing the heater and the second pump is arranged in the heating circuit.

9. A coolant circuit as claimed claim 1, wherein the exhaust gas heat exchanger includes a bypass for the exhaust gas.

10. A motor vehicle having an engine that is cooled with an engine coolant by means of a coolant circuit, wherein the coolant circuit comprises a coolant circuit as claimed in claim 1.

11. A coolant circuit as claimed in claim 1, wherein the heater comprises an air-flow heat exchanger which exchanges heat from the coolant with air flowing through the heater.

12. A coolant circuit as claimed in claim 1, wherein the heater comprises an air-flow heat exchanger which heats air which heats the passenger compartment of a motor vehicle.

13. A coolant circuit as claimed in claim 1, wherein the changeover device comprises a first position in which the coolant exiting the engine can bypass the radiator and the exhaust gas heat exchanger.

14. A method of using an apparatus comprising a coolant circuit for a motor vehicle having an engine that is cooled with an engine coolant, the apparatus comprising:
a radiator for cooling the engine coolant;
an exhaust gas heat exchanger;
a passageway for supplying engine coolant from the radiator directly to the exhaust gas heat exchanger;
a changeover device for selectively supplying engine coolant from the radiator and/or from the engine to the exhaust gas heat exchanger; and
a heater for heating air for the interior of a motor vehicle by heat exchange with engine coolant exiting the exhaust gas heat exchanger to control the temperature of exhaust gas supplied to a catalytic converter from an engine in a motor vehicle, the method comprising:
exchanging heat between the exhaust gas and the engine coolant in the exhaust gas a heat exchanger; and
selectively supplying engine coolant directly to the exhaust gas heat exchanger from the radiator.

15. A method as claimed in claim 14, wherein the supplying comprises supplying engine coolant from the radiator and from the engine.

16. A method as claimed in claim 14, further comprising selectively bypassing a portion of the exhaust gas around the exhaust gas heat exchanger.

17. A method as claimed in claim 14, further comprising controlling the temperature of engine coolant supplied to the exhaust gas heat exchanger, comprising selectively mixing engine coolant coming directly from the radiator with engine coolant coming directly from the engine.

18. A method as claimed in claim 17, wherein the temperature control comprises maintaining the temperature of the engine coolant supplied to the exhaust gas heat exchanger within a predetermined temperature range.

19. A coolant circuit for a motor vehicle having an engine that is cooled with an engine coolant, comprising:
a radiator for cooling the engine coolant;
an exhaust gas heat exchanger;
a heater for heating air for the interior of a motor vehicle by heat exchange with engine coolant exiting the exhaust gas heat exchanger;
a passageway for supplying engine coolant to the exhaust gas heat exchanger; and
a control system for controlling the temperature of engine coolant supplied to the exhaust gas heat exchanger, comprising an arrangement for selectively feeding engine coolant directly from the radiator into the passageway.

20. A method of using an apparatus comprising a coolant circuit for a motor vehicle having an engine that is cooled with an engine coolant, the apparatus comprising:
a radiator for cooling the engine coolant;
an exhaust gas heat exchanger;
a passageway for supplying engine coolant from the radiator directly to the exhaust gas heat exchanger;
a changeover device for selectively supplying engine coolant from the radiator and/or from the engine to the exhaust gas heat exchanger; and
a heater for heating air for the interior of a motor vehicle to utilize exhaust gas heat from an engine in a motor vehicle to heat an internal compartment of the vehicle that includes an engine coolant circuit and a radiator in the engine coolant circuit, comprising:
exchanging heat between the exhaust gas and the engine coolant in a heat exchanger;
supplying engine coolant directly to the heat exchanger from the radiator; and
exchanging heat between the engine coolant downstream of the exhaust gas heat exchanger and air being fed into the internal vehicle compartment.

* * * * *

UNITED STATES PATENT AND TRADEMARK OFFICE
CERTIFICATE OF CORRECTION

PATENT NO. : 6,792,898 B2
DATED : September 21, 2004
INVENTOR(S) : Matthias Banzhaf et al.

It is certified that error appears in the above-identified patent and that said Letters Patent is hereby corrected as shown below:

Title page,
Item [54], Title, should read as follows:
-- [54]  COOLANT CIRCUIT FOR MOTOR VEHICLE --

Signed and Sealed this

Fourteenth Day of December, 2004

JON W. DUDAS
*Director of the United States Patent and Trademark Office*